(12) United States Patent
Paynter

(10) Patent No.: US 6,877,646 B2
(45) Date of Patent: Apr. 12, 2005

(54) RIVETS AND METHODS FOR THEIR PRODUCTION AND USE

(75) Inventor: Cedric Berkeley Paynter, Buderim (AU)

(73) Assignee: National Innovation Centre (Australia) Pty Ltd., Queensland (AU)

( * ) Notice: Subject to any disclaimer, the term of this patent is extended or adjusted under 35 U.S.C. 154(b) by 131 days.

(21) Appl. No.: 10/204,816

(22) PCT Filed: Feb. 26, 2001

(86) PCT No.: PCT/AU01/00201

§ 371 (c)(1), (2), (4) Date: Aug. 23, 2002

(87) PCT Pub. No.: WO01/63131

PCT Pub. Date: Aug. 30, 2001

(65) Prior Publication Data

US 2003/0177626 A1 Sep. 25, 2003

(30) Foreign Application Priority Data

Feb. 24, 2000 (AU) .............................................. PQ5831

(51) Int. Cl.⁷ ............................. F16B 21/14; B25C 5/11
(52) U.S. Cl. ..................... 227/120; 29/417; 29/525.06; 411/503
(58) Field of Search ...................... 227/120; 29/525.06, 29/417; 411/502, 503, 501, 357, 358, 359, 447, 29, 922; 402/14

(56) References Cited

U.S. PATENT DOCUMENTS

| | | | | |
|---|---|---|---|---|
| 170,294 A | * | 11/1875 | Pack et al. ..................... | 402/14 |
| 172,753 A | * | 1/1876 | Lindsey ........................ | 402/14 |
| 199,085 A | * | 1/1878 | McGill ......................... | 24/703.6 |
| 210,048 A | * | 11/1878 | McGill ......................... | 24/703.6 |
| 290,336 A | * | 12/1883 | Lotz ............................ | 402/14 |
| 326,100 A | * | 9/1885 | Lounsbury ..................... | 411/501 |
| 377,029 A | * | 1/1888 | Jensen ......................... | 402/14 |
| 377,032 A | * | 1/1888 | Jensen ......................... | 402/14 |
| 940,083 A | * | 11/1909 | Stimpson ...................... | 411/502 |
| 1,121,641 A | * | 12/1914 | Bray .......................... | 228/56.3 |
| 1,500,021 A | * | 7/1924 | Wilson ........................ | 411/502 |
| 2,453,504 A | * | 11/1948 | Fleischer ...................... | 310/258 |
| 3,222,975 A | * | 12/1965 | Scott .......................... | 411/502 |
| 3,919,916 A | | 11/1975 | Alexander | |
| 4,582,238 A | | 4/1986 | Bennett et al. | |
| 5,462,454 A | * | 10/1995 | Kramer et al. ............... | 411/503 |
| 6,126,372 A | * | 10/2000 | Takata ......................... | 411/502 |

FOREIGN PATENT DOCUMENTS

| | | |
|---|---|---|
| AU | 118728 | 8/1944 |
| AU | 264736 | 5/1963 |
| WO | WO 94/14554 | 7/1994 |
| WO | WO 97/22810 | 6/1997 |

* cited by examiner

Primary Examiner—Stephen F. Gerrity
(74) Attorney, Agent, or Firm—Adama Evans P.A.

(57) ABSTRACT

There is provided self piercing rivet comprising a substantially planar metal body portion (160) having deformable tabs (161) symmetrically disposed about a slit (162) as per the first embodiment. The upper portion of the body portion (160) is provided with a V-shaped recess (163) diverging from a point (164) adjacent the centreline of the body portion (160) and terminating at the upper edge (165) of the body portion (160). The V-shaped recess (163) divides the upper portion of the body portion (160) into head tabs (166) disposed to each side of the body portion (160). The upper remaining edges of the head tabs (166) enable the rivet to be partially driven and then set by deformation of the deformable tabs (161) and the head tabs (166) against respective sides of the riveted workpiece. Methods of producing the rivets and tools for their use are also provided.

21 Claims, 14 Drawing Sheets

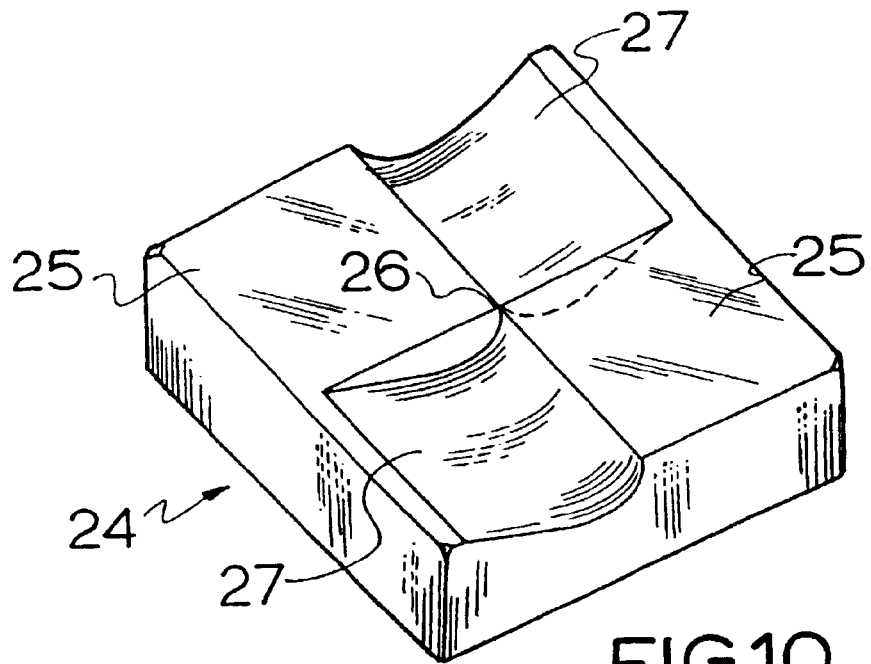
FIG.10.
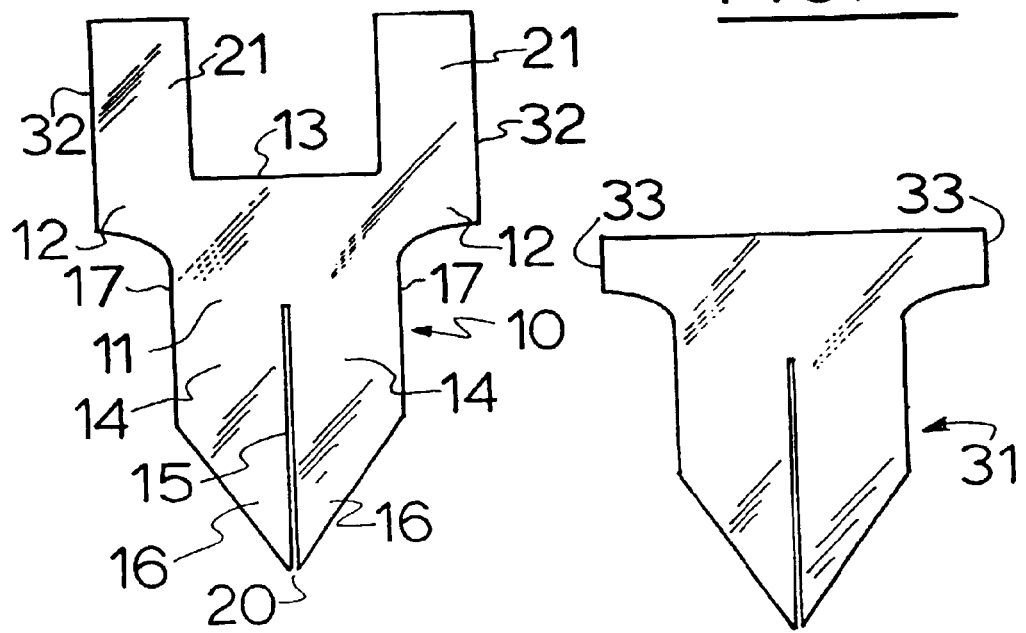
FIG.1.
FIG.2.

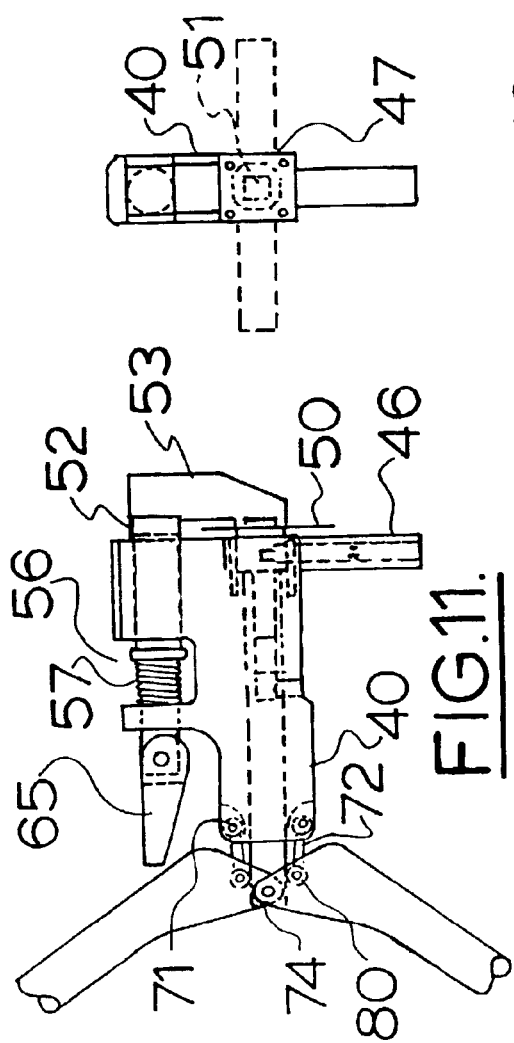
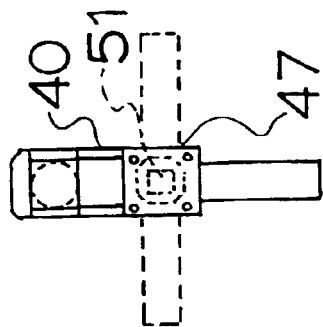
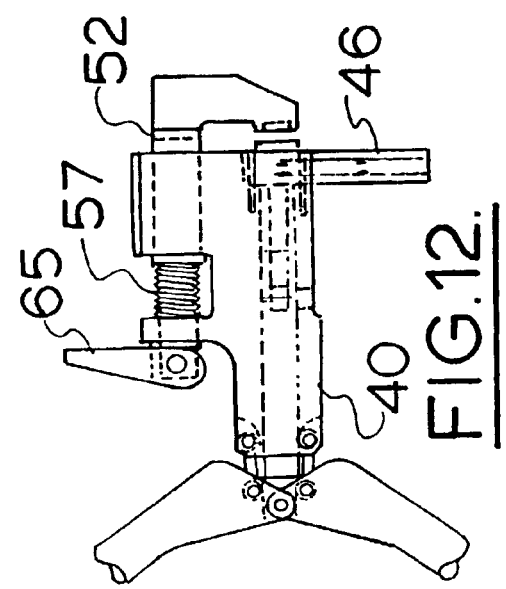

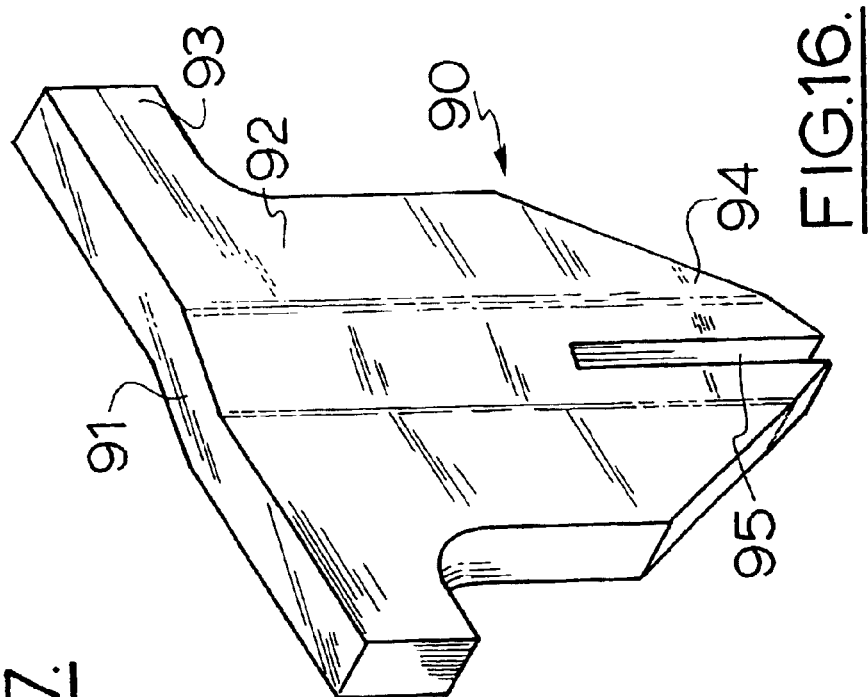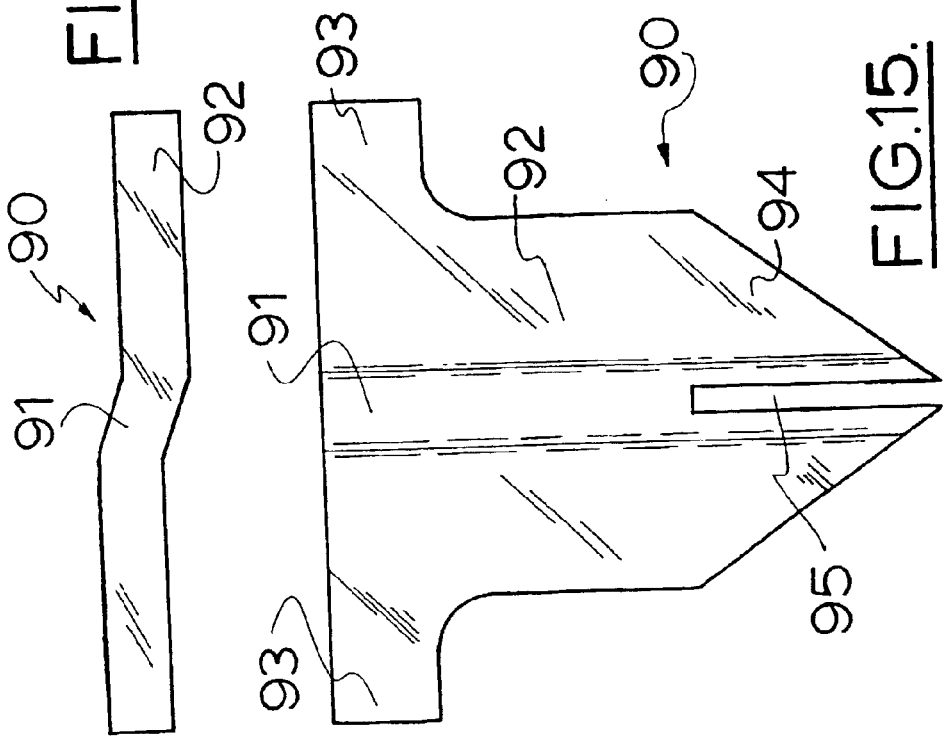

RIVETS AND METHODS FOR THEIR PRODUCTION AND USE

This invention relates to a rivet and methods for their production and use.

This invention has particular but not exclusive application to a rivet for use in assembly of rolled-section metal framing for buildings, and methods for their production and use, and for illustrative purposes reference will be made to such application. However, it is to be understood that this invention could be used in other applications, such as joining sheet metal elements generally.

In the construction of metal frame buildings, a significant proportion of the cost of the structure is the combination of the cost of fixings and the labour to employ them. Metal framing remains in most cases cost competitive with more traditional framing methods. However, it remains that the fixing costs associated with metal framing mean that the significant cost advantage held by metal framing stock over timber stock is not fully realised.

Metal framing presents particular fixing constraints. The fixings cannot remain too proud of the inner wall surface where cladding is to be fixed, since this adds to the joint build height inherent where two sections of the same nominal dimensions are overlapped. The fixings must secure the respective elements in intimate contact, again to minimize build height at the join and to present as flat a mounting for cladding as possible. The fixings are advantageously employed in such a manner as to located the respective members rigidly.

There are many fixing methods currently employed in the industry to achieve these ends. The simplest method is the use of self-drilling or PK screws to join the elements. However, these are expensive in terms of unit cost, have a relatively high failure rate in terms of sifting proud of the surface, and are not particularly well adapted to provide clamping force between the elements. Blind rivets are also used. However, these require the predrilling of the elements to receive the rivet, and are slow to install. Round rivets and PK screws are required in pairs to make a joint resistant to rotation about each fixing.

Australian patent 518231 describes a riveting system for connecting thin sheet members together and comprising a hardened, waisted, self punching rivet and a complementary die set adapted to punch the rivet through and set the sheet material into the waist portion of the rivet. The disadvantages of this arrangement include the expense of producing a high-tolerance, hardened rivet capable of punching a full diameter hole in both sheets, and the weight and cost of a die set and tool capable of providing the requisite deformation force about the hole. In cases where the joint is to be secured against relative rotation, pairs of fixings are required, unless the joint is otherwise held spatially rigid.

Australian patent 577292 discloses a self piercing riveting machine comprising an automatic feed for top-hat section, round-head rivets and a ram and anvil driving and setting arrangement. In a conventional sense, the relatively hard rivet punches a full diameter hole through the members to be a riveted and is set against the anvil. Again, the rivets are expensive and the machine must generate considerable force to achieve the punch and set actions. In order to render the joint non-rotating, the rivets must be deployed in spaced pairs in the joint, unless the joint is otherwise held spatially rigid.

Australian patent application 11780/76 describes a sheet-joining machine whereby a punch and anvil are configured to punch and deform the respective sheet members so as to make a rivetless join. However, in practice the size of the punched hole necessary to provide enough material in the join, coupled with hardening effects in the distorted material, resulted in a large power requirement, raising the weight of the tool.

This invention in one aspect resides broadly in a rivet including:

a body portion having respective ends and being of substantially elongate, uniform section between said ends;

a leading portion extending from one said end substantially coplanar with said body portion and tapering from respective side edges thereof to form a point, said leading portion being bifurcated from said point toward said body portion to form a pair of deformable tabs; and a head portion formed or formable on the other said end.

The substantially elongate, uniform section of the body portion may be substantially rectangular or other elongate prismatic section. Alternatively, the substantially elongate, uniform section may be a corrugated section or other like profile, whereby the form of the body provides for stiffening against driving and setting loads applied. The substantially elongate, uniform section may be selected to maximize the resistance to rotation of the rivet in a work piece. For example, the section may be formed from a generally planar stock and having a ridge or step formed therein.

The leading portion may be profiled in a like or different manner to the body portion, if the body portion is profiled. However, it is preferable that the leading portion be plane and unprofiled such that the leading portion is more readily deformable out of the plane. The leading portion is preferably symmetrical about the bifurcation. The bifurcation may extend to short of, at or into said body portion to form the pair of deformable tabs. The deformable tabs are preferably disposed about the bifurcation line in such a manner to permit the deformation thereof by a setting tool concurrently with the driving of the piercing portion through the pieces to be joined. The deformable tabs may be adapted to be set substantially in the plane of the body portion or transversely of the plane of the body portion. The deformable tabs may be deformed in the same direction or in substantially opposed directions.

The bifurcation between the deformable tabs may comprise a slot or alternatively may comprise a frangible partition. In a yet further alternative, the bifurcation may be putative in that the combined deformable tabs may be adapted to cooperate with bifurcation means associated with a driving or setting tool.

The formed or formable head portion may take any suitable form consistent with the function of preventing the rivet from passing entirely through the workpiece. For example, the head portion may comprise a peened portion of the end of the body portion, an otherwise shaped section extending along the end and being of larger section than the elongate section of the body portion in at least one of its two dimensions, tabs extending from the end and formed substantially perpendicular to the body portion, tabs formed substantially in the plane of the body portion and deformable by setting in use, and tabs extending from the side edges of the body portion at the end thereof and forming a shoulder adapted to bear on the workpiece in use.

The rivet may be formed integrally or may be fabricated. The rivet will usually be of metal, although it is envisaged that some plastic apparatus may find use in temporary fixing roles. The body portion may be of any selected length, width and thickness determined by the gauge and strength of the pieces to be joined. The extent of the formed or formable rivet head is selected having regard to the ability of the joined material to resist pull-through of the rivet head, under setting and service loads.

In the case of integral formation the rivet may be punched or otherwise cut from sheet material. For example, the rivet may be sequentially punched from strip material. Where the rivet is punched from strip material, the rivet may be punched or cut sequentially end to end along the centerline of the strip, side by side along one edge of the strip or alternating side by side along each edge of the strip. Preferably, the formed or formable head portions are formed from the strip material prior to separation of the completed rivet from the strip.

In a further aspect this invention resides broadly in a rivet including:

a body portion having respective ends and being of substantially elongate, uniform section between said ends;

a leading portion extending from one said end substantially coplanar with said body portion and tapering from respective side edges thereof to form a point, said leading portion being bifurcated from said point toward said body portion to form a pair of deformable tabs; and opposed lugs extending from each said side edge in the region of the other said end.

In a further aspect this invention resides broadly in a rivet including:

a body portion having respective ends and being of substantially elongate, uniform section between said ends;

a leading portion extending from one said end substantially coplanar with said body portion and tapering from respective side edges thereof to form a point, said leading portion being bifurcated from said point toward said body portion to form a pair of deformable tabs; and a formable head portion comprising a recess relieving the terminal edge of the other said end to form a deformable head lug either side of said recess.

The recess may be bounded by deformable head lugs which retain a substantial portion of the terminal edge, such that the rivet may be at least partially driven thereby, whereafter the head lugs may be deformed out of the plane of the body portion to form the rivet head. The recess may be of any suitable shape. For example, the recess may be a square sided recess, that is, a recess having side edges substantially parallel to the side edges of the body portion. Alternatively, the recess may comprise a V-shaped recess converging toward the centreline of the body portion. The recess may comprise a cut-out portion, wherein the material to be removed to form the recess is left with one or more points of attachment in the manner of a chad. Preferably, the point of attachment of the chad is such that the terminal edge of the chad may continue to serve as at least an initial driving portion for the rivet.

In a further aspect this invention resides in a method of forming a rivet including:

a body portion having respective ends and being of substantially elongate, uniform section between said ends;

a leading portion extending from one said end substantially coplanar with said body portion and tapering from respective side edges thereof to form a point, said leading portion being bifurcated from said point toward said body portion to form a pair of deformable tabs; and a head portion formed or formable on the other said end, from strip metal material and including the steps of:

sequentially forming a plurality of spaced partitions transversely on said strip, said partitions serving as said bifurcation in the finished rivet;

sequentially punching said strip between said partitions to form one of said side edges and deformable tabs of each of adjacent rivets; and sequentially shearing between said adjacent rivets to release the finished rivet from the strip.

The formation of the respective partitions may be by any selected means. For example, the partitions may be formed by shearing a slit or by punching a frangible partition into the strip. In the case of metal strip, the partition may advantageously be formed by a first shear to form a slit, followed by one or more flattening steps adapted to reconfigure the strip for subsequent processing. The sequentially punching of the strip between formed partitions to form the side edges and deformable tabs is preferably done in a single punching operation, although it is envisaged that this may be done in two or more punching steps.

In a further aspect this invention relates to a method of setting a self piercing rivet including:

a body portion having respective ends and being of substantially elongate, uniform section between said ends;

a leading portion extending from one said end substantially coplanar with said body portion and tapering from respective side edges thereof to form a point, said leading portion being bifurcated from said point toward said body portion to form a pair of deformable tabs; and a head portion formed or formable on the other said end, and including the steps of:

providing a fastening tool having driving means adapted to hold and drive said self piercing rivet piercing portion first towards a setting anvil opposed to said driving means;

locating a work piece having opposite surfaces between said driving means and setting anvil;

operating said driving means to drive said piercing portion through said work piece until said head portion is abutting one said opposite surface, said anvil being selected to progressively deform said deformable tabs into engagement with the other said opposite surface.

In a further aspect this invention relates to a fastening tool for a self piercing a rivet including:

a body portion having respective ends and being of substantially elongate, uniform section between said ends;

a leading portion extending from one said end substantially coplanar with said body portion and tapering from respective side edges thereof to form a point, said leading portion being bifurcated from said point toward said body portion to form a pair of deformable tabs; and a head portion formed or formable on the other said end, and including;

driving means adapted to hold and drive said self piercing rivet through a workpiece to be joined until said head portion is abutting one said workpiece;

a setting anvil opposed to said driving means and adapted to set said deformable tabs against said workpiece;

magazine means adapted to store a plurality of said self piercing rivets; and feed means adapted to sequentially supply said self piercing rivets from said magazine means to said driving means between driving operations thereof.

Preferably, the anvil means is selected to deform the deformable tabs out of the plane of the body portion and in opposed directions to achieve the set. The driving means may be a manually operated mechanical or hydraulic driving means. Alternatively, the driving means may be of a powered type, such as electromechanical, hydraulic or pneumatic means.

The magazine means may be adapted to store the plurality of self piercing rivets in any selected orientation determined by the feed means. However, in the case of the sequentially punched rivets, these are advantageously magazined with their planar faces abutting, in order to present the maximum linear density and thus shorten the magazine. To this end, the rivets are preferably adhered together by means permitting the feed means to shear a rivet from the row in the magazine as required.

In a hand tool for driving the fastening means there may be provided a tool body having a fixed jaw and a movable jaw mounted thereto. The movable jaw may for example be mounted in sliding relation to the tool body in a bore or on a track or the like. Alternatively, the movable jaw may be hinged to the fixed jaw. The movable jaw may be adapted to clamp a workpiece between the jaws. For example, the tool body and the movable jaw may be provided with camming means, lever, speed clamp or other threaded means to effect clamping. The movable jaw may be provided with a setting anvil in the form of an anvil piece or the setting anvil may be integrally formed in a hardened jaw.

The driving means may comprise a plunger or ram extending through the tool body toward the setting die. For example, the tool body may be provided with a bore or slot in which the plunger or ram may be mounted whereby the leading end may be advanced toward the setting anvil. Preferably the plunger or ram is provided with a profiled leading end to conform to the driving edge of the rivet, and to this end it is also preferred that the bore in the tool body be profiled at its jaw end to conform to the leading end. The magazine is preferably configured to interpose the rivet close to the jaw end of the profiled leading end.

The plunger or ram may be operable by any suitable manual or powered means as hereinbefore described and including by means of simple or compound levers, lost motion arrangements, hydraulic ram or the like.

In order that this invention may be more readily understood and put into practical effect, reference will now be made to the accompanying drawings which illustrate preferred embodiments of the invention and wherein:

FIG. 1 is a view of a rivet in accordance with the present invention;

FIG. 2 is a view of an alternative rivet in accordance with the present invention;

FIG. 10 is a setting anvil suitable for use in a tool for setting the apparatus of FIGS. 1 and 2;

FIG. 11 is a side view of a tool for use with the apparatus of FIG. 1 operably closed about a workpiece;

FIG. 12 is a partial side view of the tool of FIG. 11, operatively open to receive a workpiece;

FIG. 13 is a partial front view of the tool of FIG. 11;

FIG. 15 is a view of an alternative rivet in accordance with the present invention;

FIG. 16 is a perspective view of the rivet of FIG. 15;

FIG. 17 is a plan view of the rivet of FIG. 15;

Figure 3:
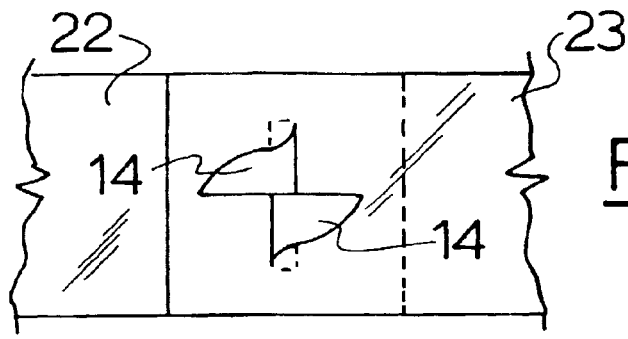
FIG. 3 is a bottom plan view of the apparatus of FIG. 2 in use.
Figure 4:
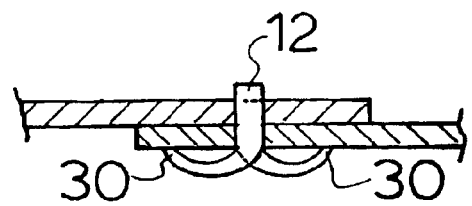
FIG. 4 is a vertical section through a joint made using the apparatus of FIG. 2.
Figure 5:
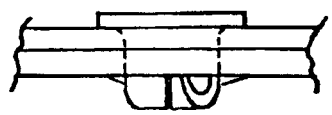
FIG. 5 is an end view of a joint made utitlizing the apparatus of FIG. 2.
Figure 6:
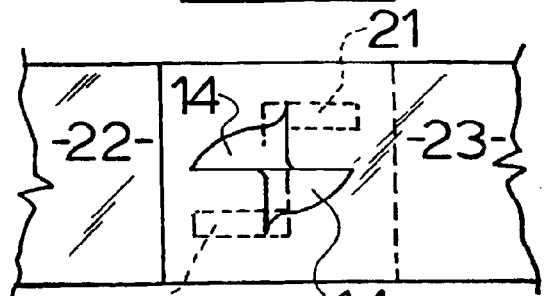
FIG. 6 is a bottom plan view of a joint made using the apparatus of FIG. 1.
Figure 7:
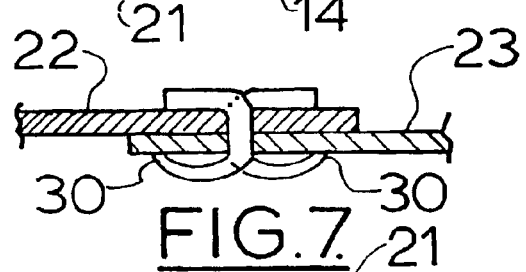
FIG. 7 is a vertical section through a joint made using the apparatus of FIG. 1.
Figure 8:
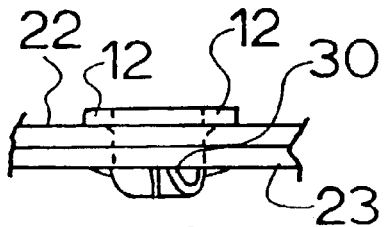
FIG. 8 is an end view of a joint made utitlizing the apparatus of FIG. 1.
Figure 9:
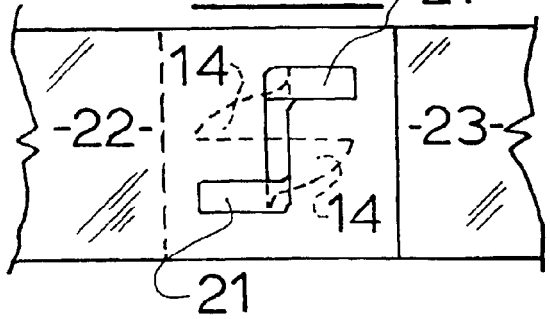
FIG. 9 is a top plan view of the apparatus of FIG. 1 in use.
Figure 14:
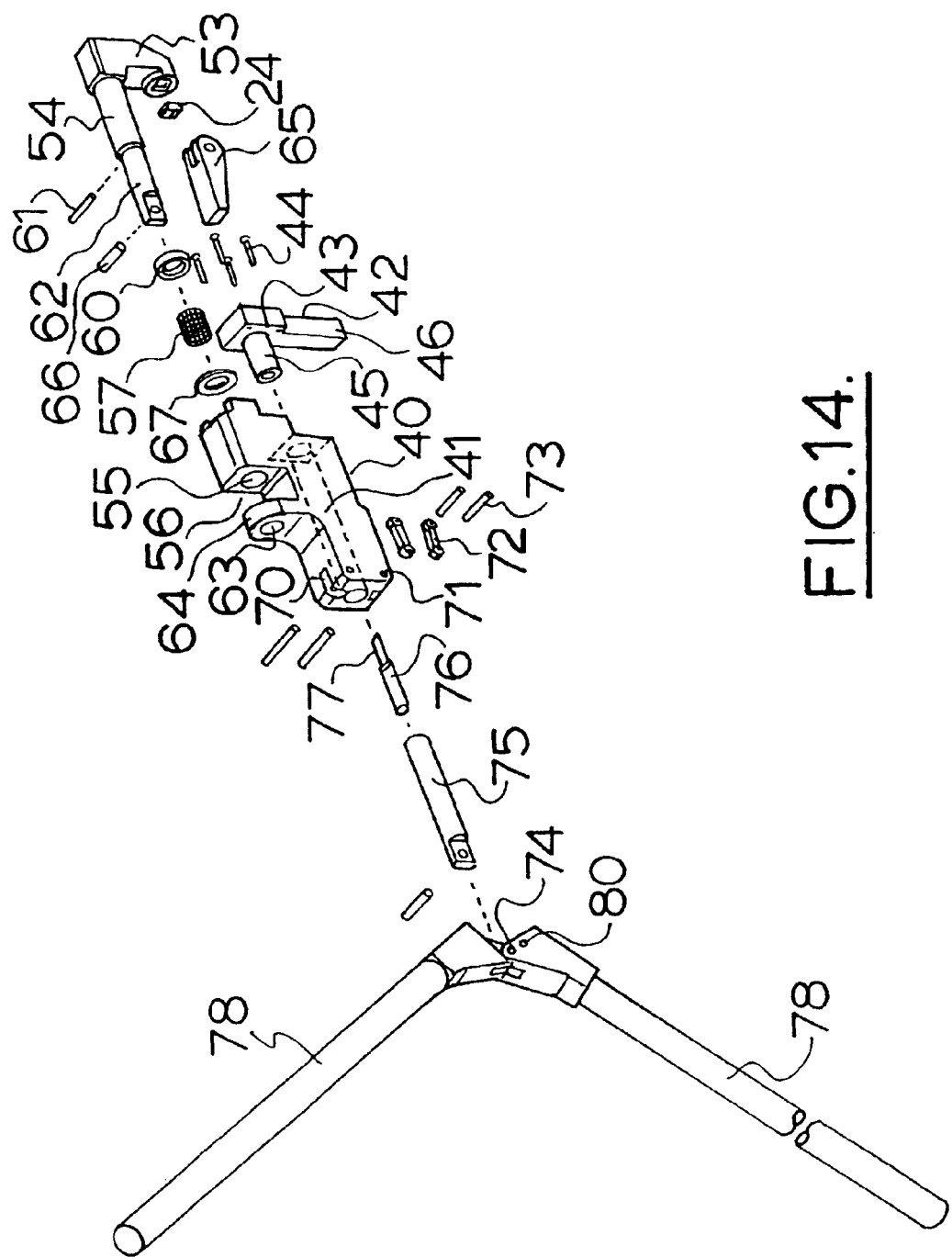
FIG. 14 is an exploded perspective view of the tool of FIG. 11;.

With reference to FIGS. 1 and 2 there are illustrated alternate embodiments of rivets in accordance with the present invention. In the embodiment of FIG. 1 there is provided a rivet 10 of unitary construction and comprising a substantially planar body portion 11 having a pair of opposed lug portions 12 extending coplanar of the body portion 11 about an end 13 thereof. Pair of deformable tabs 14 is integral and coplanar with the body portion 11 and are disposed about a slit 15. The outer ends 16 of the edge portions 14 are relieved from the side edges 17 of the body portion 11 to form a piercing point 20. The lugs 12 are formed coplanar with a pair of locking tabs 21 extending beyond the end edge 13 of the body portion 11.

The use of the rivet 10 of FIG. 1 is best illustrated in FIGS. 6, 7, 8 and 9 which illustrate the rivet 10 when used to fix overlapping sheet members 22 and 23. The rivet is supported to be driven by driving means (not shown) of two-stage type. The first stage bears against the end 13 and drives the point 20, deformable tabs 14 and body member 11 through the sheet materials 22, 23 against the reaction of the anvil 24 illustrated in FIG. 10. The first stage drives the rivet through until the lugs 12 bear on the outermost 22 sheet material. The second stage of the driving means then serves to bend the tabs 21 down to contact the outermost 22 of the sheet materials. As the point 20 penetrates the lower 23 sheet, the forming joint is supported on lands 25 of the anvil 24. The lands 25 meet at an apex 26 adapted to coincide with the point 20 of the advancing rivet 20. Respective forming surfaces 27 of the anvil 24 pick up respective deformable tabs 14 and with the advancing rivet 10 deform the deformable tabs 14 until the lower sheet 23 is contacted at 30, thus placing the joint in compression between the deformable tabs 14 and the lugs 12. The tabs 21 provide resistance to pull through of the rivet 10.

In the alternative embodiment of FIG. 2, there is provided a rivet 31 of substantially the same form as that illustrated I FIG. 1, with like features to be interpreted as per FIG. 1. The sole difference between the two embodiments is the absence of the tabs 21, thus removing the requirement for use of a two stage driving means.

In both embodiments, the apparatus was produced from 304 stainless strip of 1.2-mm thickness by a multiple stage punching process. In the embodiment of FIG. 1 the stainless strip advances to a shearing station wherein a shear cuts the slits 15 of respective rivets 10 transverse to the long edge of the strip and spaced apart by the pitch of the rivet 10. Following the shearing of the strip to form the slits 15, the distorted strip is passed through two flattening stages to bring the strip back into planarity. Thereafter, the strip passes through respective punches to punch out the spaces bounded by the lugs 21 and the end 13 by means of a first punch, and the space bounded by the deformable tabs 14 and lugs 12 of adjacent rivets 10 by a second punching operation. After sequential punching of the respective spaces, the strip passes to a shearing station where the rivet 10 is cut from the advancing strip by shearing between the respective tab 21 and lug 12 portions, along edges 32.

With reference to the apparatus of FIG. 2, this is produced in substantially the same manner as the apparatus of FIG. 1, except that the absence of tabs 21 means that the first punching step may be dispensed with, the rivet 31 being separated in the final shearing step at adjacent lug portions through sheer line 33.

In FIGS. 11 to 14 there is illustrated a hand tool for use with the rivet 10 and including a machined tool body 40 having a smooth longitudinal bore 41 therethrough. Mounted at the forward end of the tool body 40 is a magazine and inner jaw assembly 42 that is secured to the tool body 40 at mounting face 43 by bolts 44. The magazine and inner jaw assembly 42 has a spigot 45 adapted to enter and conform closely with the bore 41, to in effect provide a stepped bore within the tool body 40. A magazine portion 46 is adapted to receive a flats-together stack of the rivet 10, with their piercing points facing forward. The magazine and inner jaw assembly 42 has a front face 47 adapted to bear against the workpiece 50. The front face 47 has a fastening delivery slot 51 which extends through the magazine and inner jaw assembly 42 to intersect and form the upper stop of the magazine space, and extends rearward to coaxially enter the bore of the spigot 45. The magazine portion 46 is loaded from beneath and is closed by an end cap and spring (not shown) that cooperate to urge the stack of rivets up such that the uppermost fastening is aligned with the delivery slot 51.

An outer movable jaw assembly 52 includes a jaw portion 53 having secured at its outer end the anvil 24 illustrated in FIG. 10. The jaw portion 53 is located in sliding relation to the tool body 40 by interaction of a shank 54 with a bore 55 provided in the tool body 40. The bore 55 is intersected by a cutout 56 whereby the shank may receive therein a spring 57 and spring stop 60 secured by roll pin 61 when assembled to the tool body 40. Extending coaxially from the rear of the shank 54 is an integral operating rod 62 adapted to pass through a bore 63 provided in a reaction lug 64 defining the rear wall of the cutout 56. A lever cam 65 is pivotally secured to the end of the operating rod 62 in assembly by pin 66, cam thrust on the reaction lug 64 being transmitted through hardened thrust washer 67. Operation of the cam 65 against the bias of spring 57 draws the jaw portion toward the workpiece 50 to clamp the workpiece 50 against the anvil 24.

At the rear of the tool body 40 there is provided a pair of vertical slots 70 above and below the bore 41, the slots 70 being intersected by cross drillings 71. The slots 70 receive respective lost motion links 72 that are pivotally retained therein by pins 73. A pair of handles 78 are pivotally interconnected at 74 with a ram 75 gauged to pass in to the bore 41. The forward end of the ram 75 is secured to a hardened driving pin 76 having a flat section 77 profiled to pass through the section of the slot 51 to drive the fixing therethrough. Mechanical advantage is provided by virtue of the links 72 having their outer ends pivotally connected to the respective handles 78 at 80, being a short distance from the pivot 74 relative to the handle length.

With reference to the alternative embodiments of rivets illustrated in FIGS. 15–23 and setting apparatus for use with rivets in accordance with the present invention and illustrated in FIGS. 24–29, the applicant provides as follows:

FIGS. 15–17 illustrate the rivet illustrated generally at 90 formed substantially as per the previous examples. This embodiment is distinguished by being punched having an opposite portion 91 extending substantially co-axially to the rivet 90. The offset 91 fulfills several functions, the first function is to substantially stiffen the rivet 90, which stiffening is more pronounced in the body 92 and between the lugs 93 as opposed to the deformable tabs disposed about the slit 95. The second advantage of the opposite 91 is that the lugs 93 are out of alignment when set into the workpiece thus interrupting the lines of stress imposed on the workpiece.

With reference to the further rivet illustrated in FIGS. 18–23, these comprise a substantially planar body portion 100 having deformable tabs 101 symmetrically disposed about a slit 102 as per the first embodiment. However in this embodiment the upper portion of the body is provided with a pair of divergent slits 103 extending from points adjacent the centreline of the body 100 and terminating at the upper edge of the body 100. The slits 103 divide the upper portion of the body 100 into tabs 104 disposed to each side of the body portion 100 and a drivable knockout 105 between the slits 103.

Figure 18:
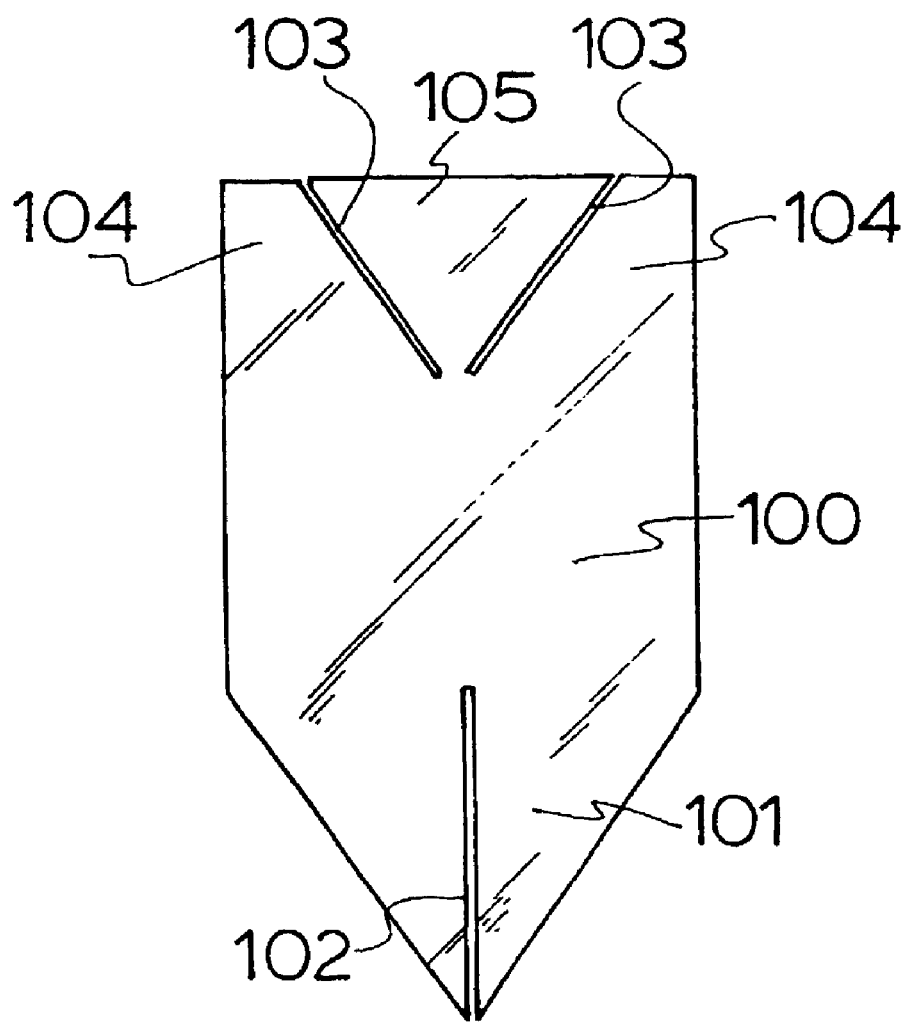
FIG. 18 is a further alternative rivet in accordance with the present invention.
Figure 19:
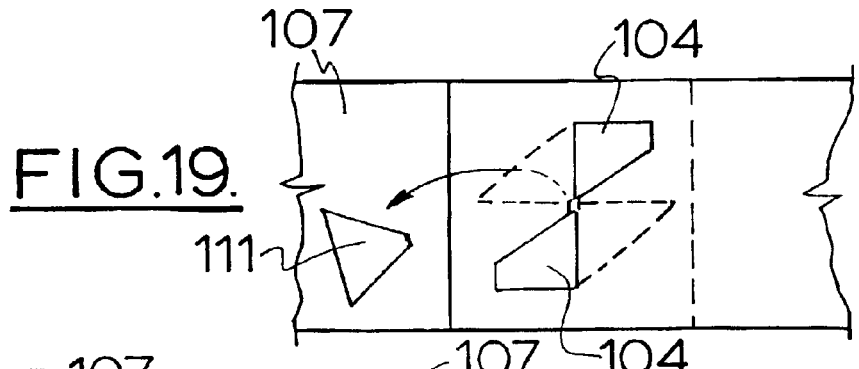
FIG. 19 is a view of the apparatus of FIG. 18 in use.
Figures 20, 21:
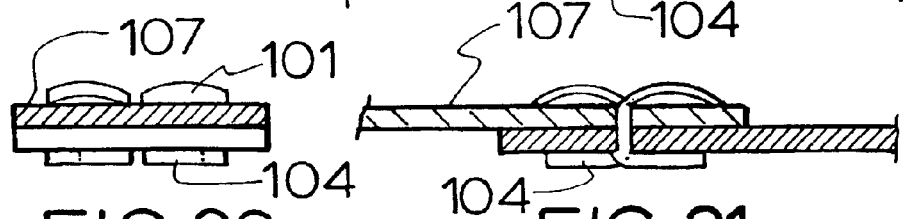
FIG. 20 is a section through a joint formed using the apparatus of FIG. 18.
FIG. 21 is an alternate section through the joint made with the apparatus of FIG. 18.
Figure 22:
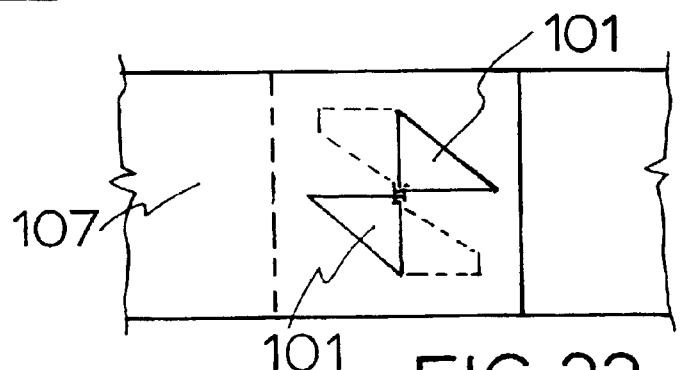
FIG. 22 is an end view of the joint made using the apparatus of FIG. 18.
Figure 23:
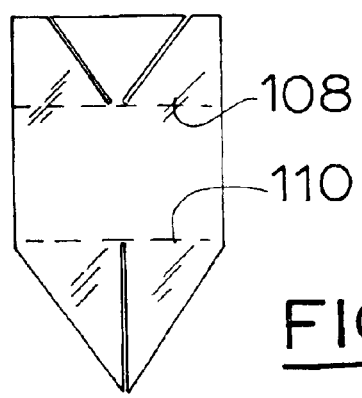
FIG. 23 is a view of the apparatus of FIG. 18 showing fold line positions.
Figures 24, 25:
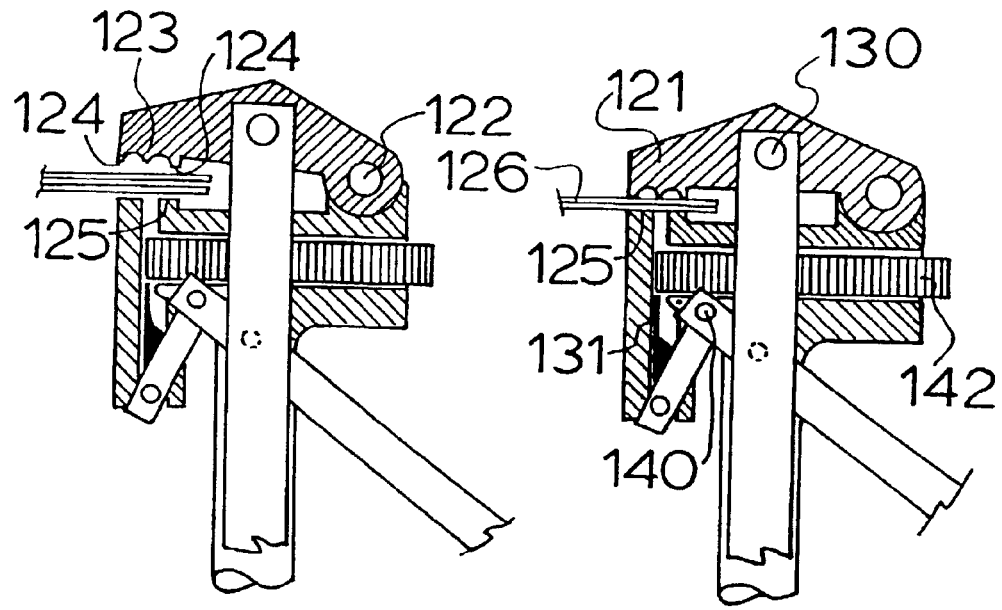
FIGS. 24–27 are a progressive series of views illustrating the making of a joint using apparatus in accordance with the present invention using apparatus for the purpose.
Figures 26, 27:
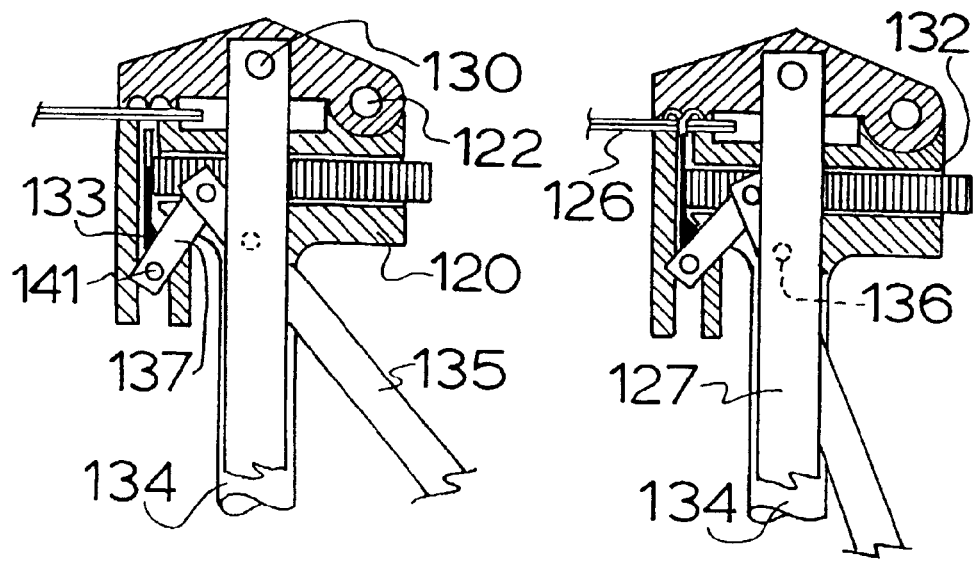

The distinguishing feature of the apparatus of FIGS. 18–23 is that the need for lugs extending generally beyond the sides of the body portion 100 is dispensed with. However since the upper remaining edges of the tabs 104 are of relatively small size, the drivable knockout 105 remains in place while the rivet is driven and set as illustrated in FIGS. 19–23. Referring to FIG. 19 it can be seen that the workpiece 107 has had the apparatus of FIG. 18 driven therethrough and set with the respective tabs 104 formed against the workpiece 107 by bending out of the plane of the body 100 in respective directions. The setting action concurrently sets the deformable tabs 101 on the reverse side of the workpiece 107 as illustrated in FIG. 22. The forming lines 108, 110 are illustrated in FIG. 23. In the setting process, the metal of the body 100 in the region of the apex of the slits 103 work hardens to frangibility and breaks off to form a metal chad 111.

With reference to the alternative fastening tool illustrated in FIGS. 24-29 and referring first to the sequential drawings of FIGS. 24-27, there is provided a tool having a static body portion 120 having a movable clamping jaw 121 pivoted thereto about pinned 122. The clamping jaw 121 is provided with a setting anvil portion 123 which is bounded by clamping faces 124. The clamping faces 124 oppose corresponding clamping faces 125 provided on the static body 120. A workpiece 126 is clamped between the respective clamping surfaces 124 and 125 by an operating rod 127 pivoted to the movable jaw 121 at pivot 130. The static body 120 is provided with a driving assembly bore 131 intersected by a magazine bore 132. Slidably mounted in the bore 131 is a driving member 133 driven forward by the action between fixed handle 134 and moving handle 135 having a primary pivot at 136 and gaining secondary mechanical advantage via link 137 pivoted to the movable handle end at 140 and to the driving member 133 at pivot 141.

Magazined rivets 142 pass through the magazine bore 132 and are in sequential index with the driving member 133.

In use the workpiece 126 is inserted between the clamping surfaces 124, 125 whereupon the operating rod 127 is operated to close the clamping surfaces 124, 125 against the workpiece 126. Operation of the movable handle relative to the fixed handle 134 effects the forward motion of the driving motion 133 against the indexed rivet and thereafter drives the rivet through the workpiece 126 to be set against the setting anvil portion 123 of the movable jaw 121.

Figure 28:
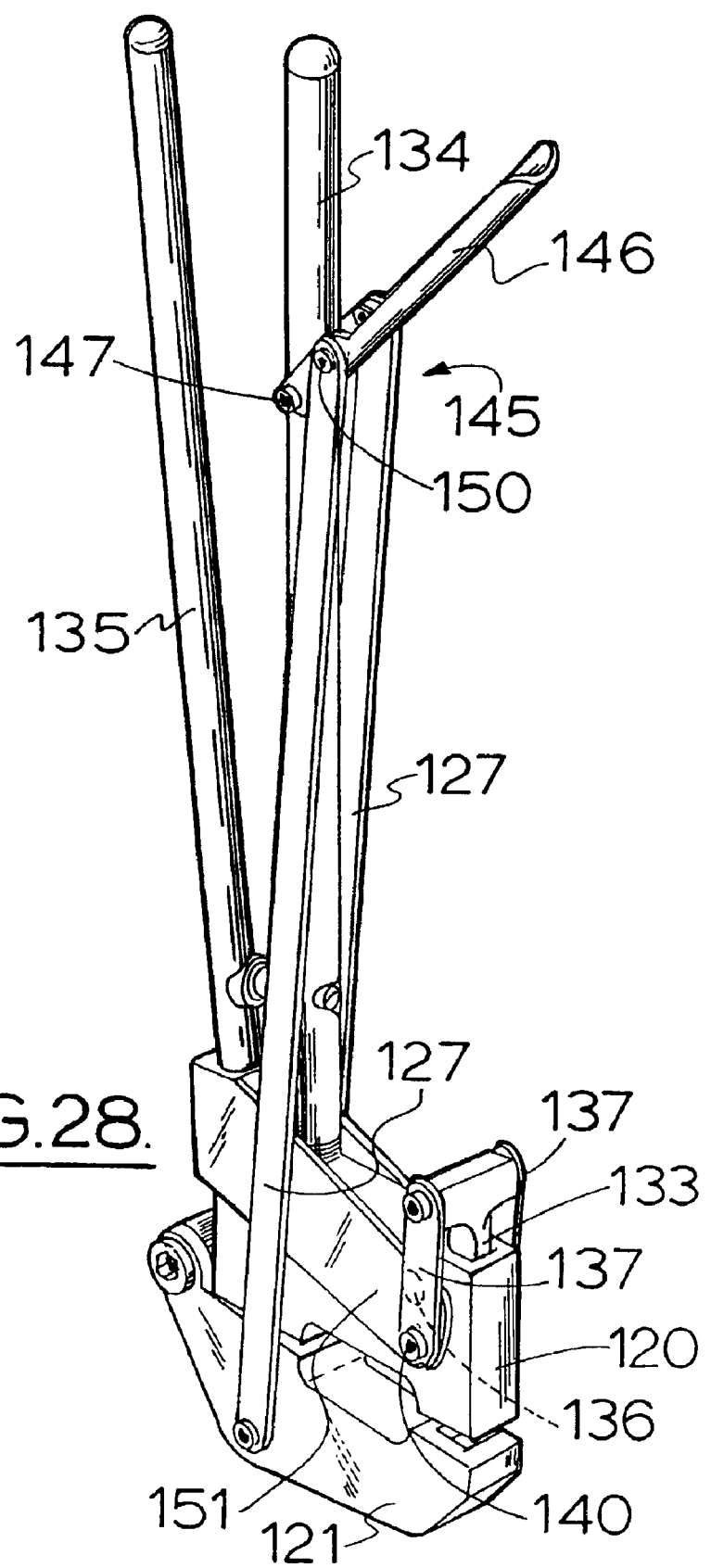
FIG. 28 is a perspective view of a tool for setting rivets in accordance with the present invention.
Figure 29:
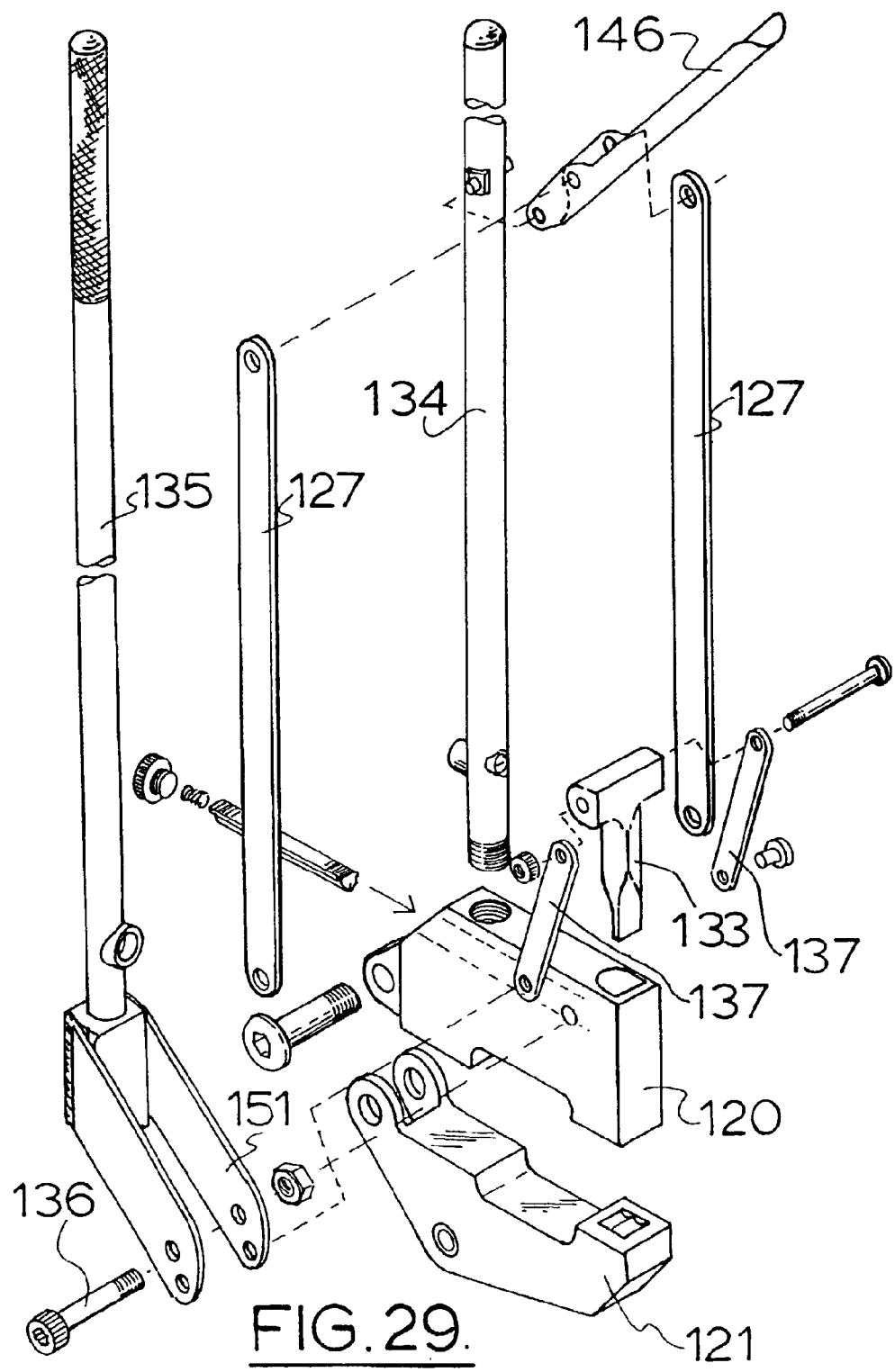
FIG. 29 is an exploded view of the tool of FIG. 28

With reference to the full perspective view and exploded view of the aforementioned tool illustrated in FIGS. 28 and 29 respectively, the components described are numbered according to FIGS. 24–27.

It can be seen that the operating rod 127 is operated by an overcentering mechanism 145 comprising a hand lever 146 pivoted to the fixed handle 134 at 147 and itself being pivoted in an overcentering position at 150 to the operating rod 127, which is duplicated on each side of the fixed handle 134 to provide symmetrical loading.

With reference to operation of the driving member 133, the link 137 is paired on either side of the static body 120. The movable handle 135 has yoke arms 151 extending each side of the tool and pivoted thereto by pivot pin 136. The ends of the links 137 are pivoted to the yoke arms 151 at 140.

Figure 30:
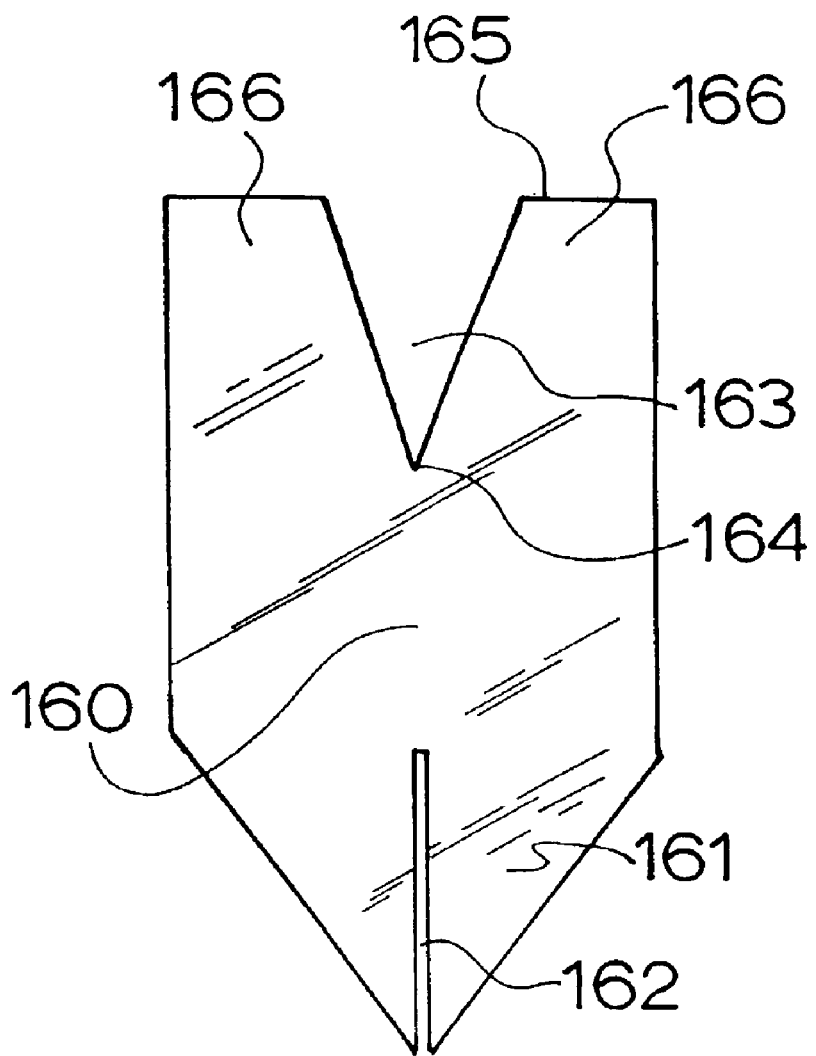
FIG. 30 is a yet further alternative rivet in accordance with the present invention.
Figure 31:
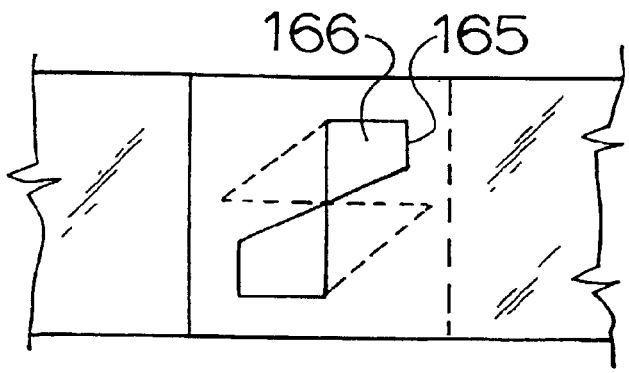
FIGS. 31 to 34 illustrate the rivet of FIG. 30 in use.
Figure 32:
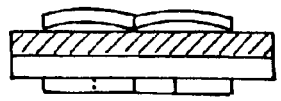
Figure 33:
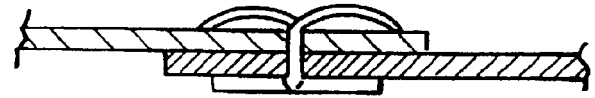
Figure 34:
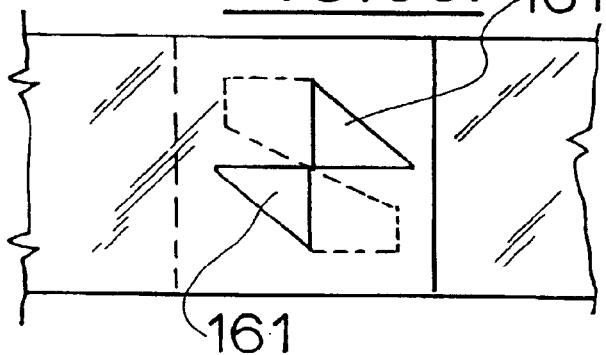
Figure 35:
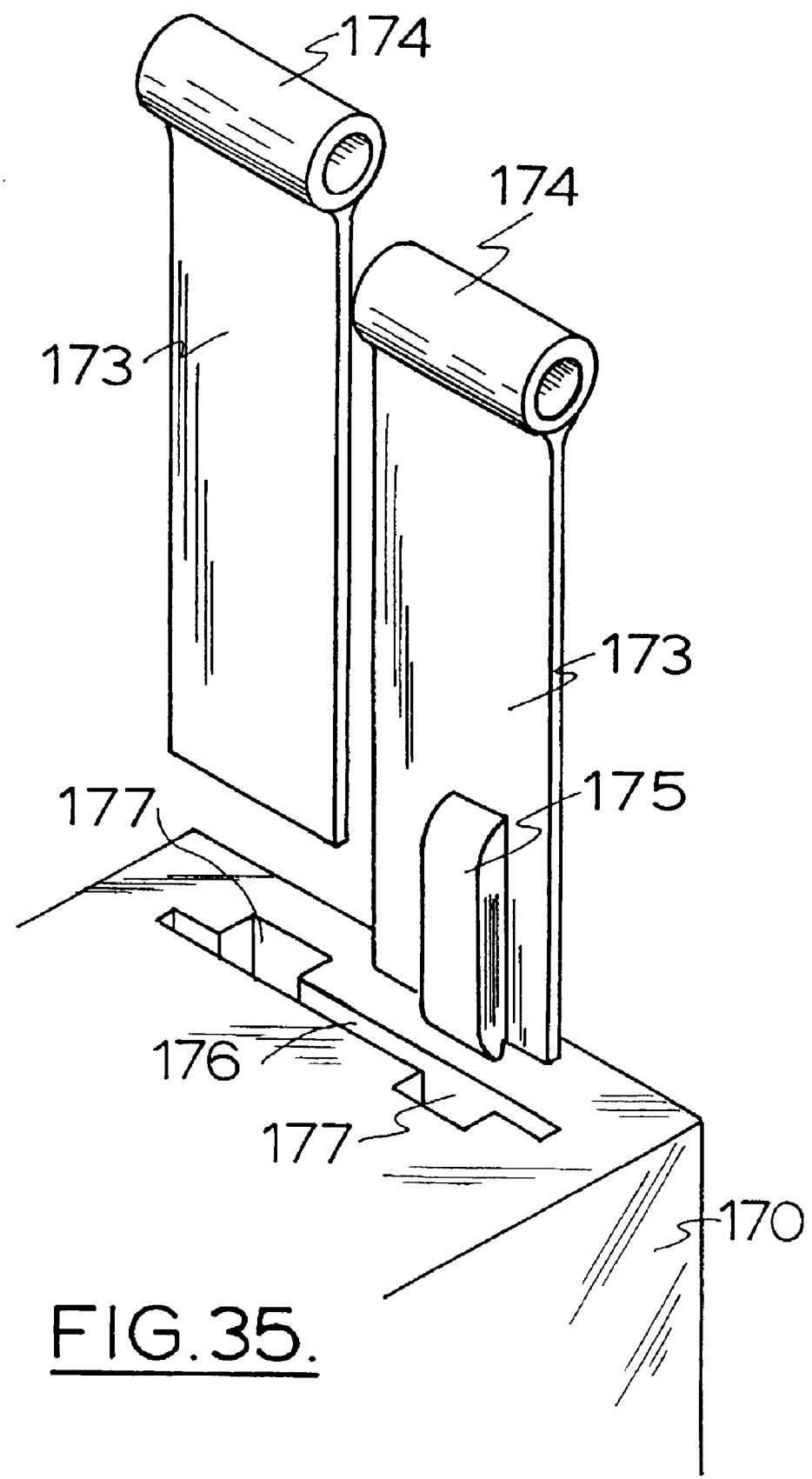
FIG. 35 is a driving element for the tool of FIG. 28 for use with the rivets of FIGS. 18 and 30, and FIGS. 36 to 38 illustrate the driving element of FIG. 35 in use.
Figure 36:
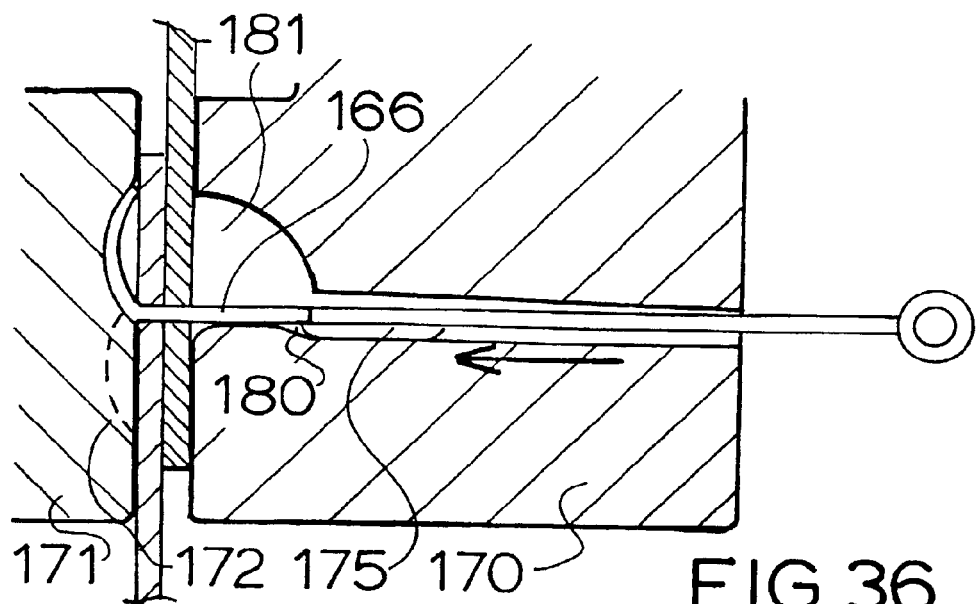
Figure 37:
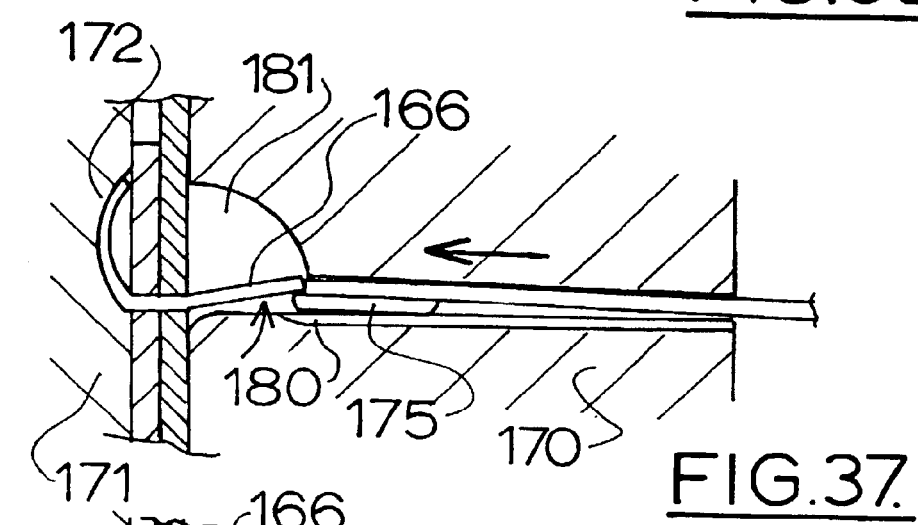
Figure 38:
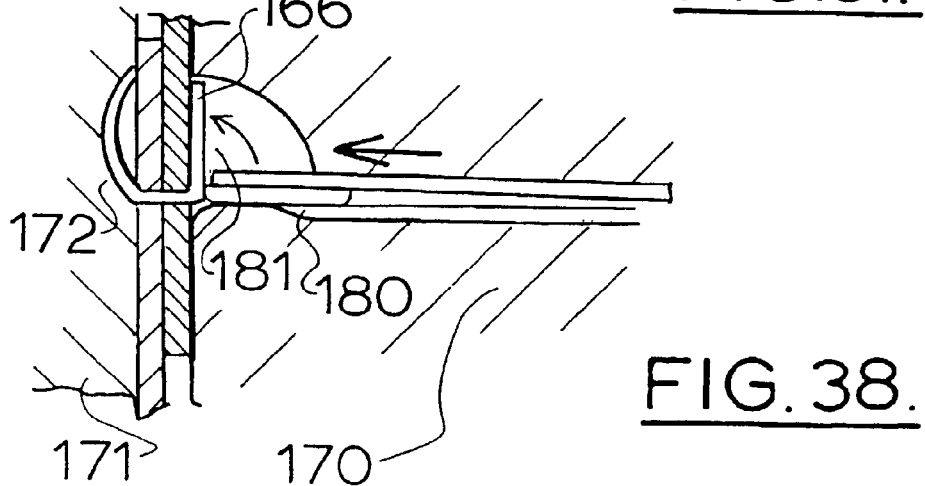

With reference to the alternate rivet of FIG. 30, there is provided a substantially planar body portion 160 having deformable tabs 161 symmetrically disposed about a slit 162 as per the first embodiment. However in this embodiment the upper portion of the body is provided with a V-shaped recess 163 diverging from a point 164 adjacent the centreline of the body 160 and terminating at the upper edge 165 of the body 160. The V-shaped recess 163 divides the upper portion of the body 160 into head tabs 166 disposed to each side of the body portion 160.

The distinguishing feature of the apparatus of FIG. 30 is that the need for lugs extending generally beyond the sides of the body portion 160 is dispensed with. The upper remaining edges of the tabs 166 enable the rivet to be partially driven and set as illustrated in FIGS. 31–34. The tool for setting rivets such as those illustrated in FIGS. 18 and 30 are modified as illustrated in FIGS. 35 to 38, wherein there is provided as fixed tool body 170 and a movable jaw 171 having a setting anvil 172 as before. The driving member (not shown) has pivoted to its outer end a pair of adjacent driving elements 173 via hinge elements 174. The driving elements 173 each have a cam 175 on a face thereof, and the drive slot 176 of the fixed tool body 170 is relieved to take the cam in sliding relation at grooves 177. The relieved grooves 177 terminate at respective camming surfaces 180 which the cams 175 may engage. The drive slot 176 is tapered to allow the cam 175 to deflect its respective driving element 173. The workpiece end of the slot 176 is relieved at 181 to allow the head tabs 166 room to be folded over.

It will of course be realised that while the foregoing has been given by way of illustrative example of this invention, all such and other modifications and variations thereto as would be apparent to persons skilled in the art are deemed to fall within the broad scope and ambit of this invention as defined in the claims appended hereto.

What is claimed is:

1. A self-piercing metal fixing rivet including:
    a substantially planar body portion extending along an axis between respective ends and being of substantially uniform section between said ends transverse said axis;
    a leading portion extending from one said end substantially coplanar with said body portion and tapering from respective side edges thereof to form a point, said leading portion being bifurcated from said point toward said body portion to form a pair of tabs adapted to be deformed against an anvil; and
    a head portion formed substantially coplanar with said body portion and having a terminal edge adapted to be engaged by a driving tool for driving the rivet leading portion point-first through a work piece.

2. A rivet according to claim 1, wherein said substantially uniform section of the body portion is substantially rectangular.

3. A rivet according to claim 1 or claim 2, wherein said leading portion is substantially symmetrical about said bifurcation.

4. A rivet according to claim 1, wherein said deformable tabs are adapted to be deformed against said anvil in a direction substantially transverse of the plane of the body portion.

5. A rivet according to claim 4, wherein said deformable tabs are adapted to be deformed in substantially opposed directions.

6. A rivet according to claim 1, wherein said bifurcation between the deformable tabs comprises a slot.

7. A rivet according to claim 1, wherein said head portion includes head tabs selected from head tabs formed substantially in the plane of the body portion and deformable by setting by said driving tool in use, and head tabs extending from respective said side edges of the body portion and forming a shoulder adapted to bear on said work piece in use.

8. A rivet according to claim 7, wherein said head portion comprises a recess relieving said terminal edge to define said deformable head tabs either side of said recess.

9. A rivet according to claim 8, wherein said recess is bounded by deformable head tabs which retain a substantial portion of said terminal edge, such that the rivet may be at least partially driven thereby, whereafter the head tabs may be deformed out of the plane of the body portion to form a rivet head.

10. A rivet according to claim 8 or 9, wherein said recess is selected from a square sided recess, a V-shaped recess converging toward the axis of the body portion, and a recess comprising a cut-out portion wherein the cut out portion is left in position with one or more points of attachment.

11. A rivet according to claim 10, wherein said point of attachment of the cut out portion is such that the terminal edge of the cut out portion may continue to serve as at least an initial driving portion for the rivet.

12. A rivet according to claim 10, wherein said recess is a V-shaped recess.

13. A rivet according to claim 1, wherein said bifurcation between the deformable tabs comprises a frangible partition formed in said leading portion along said axis.

14. A method of forming a plurality of rivets according to claim 1, including the steps of:
    forming a plurality of spaced said bifurcations transversely on a strip of metal;
    sequentially punching said strip between said bifurcations to form one of said side edges, deformable tabs and one half of the head portions of each of adjacent rivets; and
    sequentially shearing between said adjacent rivets to release the finished rivet from the strip.

15. A method according to claim 14, wherein said bifurcations are formed by shearing a slit.

16. A method according to claim 15, wherein said slit is formed by a first shear step to form a slit, followed by one or more flattening steps adapted to reconfigure the strip for subsequent processing.

17. A method of setting a rivet according to claim 1 in a work piece, including the steps of:
   providing said driving tool adapted to hold said rivet and drive said piercing portion by said terminal edge towards a setting anvil opposed to said driving tool;
   locating said work piece having opposite surfaces between said driving tool and said setting anvil;
   operating said driving tool to drive said piercing portion through said work piece until said head portion is abutting one said opposite surface, said anvil being selected to progressively deform said deformable tabs into engagement with the other said opposite surface.

18. A fastening tool for use in the method of claim 17, including said driving tool and said setting anvil, and further including:
   magazine means adapted to store a plurality of said rivets in planar-face-to face relation; and
   feed means adapted to sequentially supply said rivets from said magazine means to said driving tool between driving operations thereof.

19. A fastening tool according to claim 18, wherein said setting anvil is selected to deform the deformable tabs out of the plane of the body portion and in opposed directions.

20. A fastening tool according to claims 19, wherein said setting anvil means comprises a movable jaw adapted to clamp said work piece to a tool body associated with said driving tool.

21. A fastening tool according to claim 17, wherein said driving means comprises a plunger or ram provided with a profiled leading end to conform to said terminal edge of the rivet.

* * * * *